United States Patent

[11] 3,634,832

[72] Inventor Romano Taddei
Cascinette D'Ivrea (Turin), Italy

[21] Appl. No. 764,164
[22] Filed Oct. 1, 1968
[45] Patented Jan. 11, 1972
[73] Assignee Ing. C. Olivetti & C. S.p.A.
Turin, Italy
[32] Priority Oct. 3, 1967
[33] Italy
[31] 53244-A/67

[54] ELECTRONIC RECIRCULATING STORES
5 Claims, 1 Drawing Fig.

[52] U.S. Cl. .......... 340/172.5
[51] Int. Cl. .......... G06f 13/02
[50] Field of Search .......... 340/172.5, 173; 235/157, 165

[56] References Cited

UNITED STATES PATENTS

| | | | |
|---|---|---|---|
| 3,235,849 | 2/1966 | Klein | 340/172.5 |
| 3,471,835 | 10/1969 | Gribble et al. | 340/172.5 X |
| 3,275,993 | 9/1966 | Bartlett et al. | 340/172.5 |
| 3,308,440 | 3/1967 | Truitt et al. | 340/172.5 |
| 3,350,697 | 10/1967 | Hirvela | 340/172.5 |
| 3,351,917 | 11/1967 | Shimabukuro | 340/172.5 |
| 3,394,355 | 7/1968 | Sliwkowski | 340/172.5 |

*Primary Examiner*—Gareth D. Shaw
*Assistant Examiner*—Sydney R. Chirlin
*Attorney*—Birch, Swindler, McKie & Beckett

ABSTRACT: An electronic store comprising a plurality of data registers of the static, recirculating type operating in parallel with each other. In order to keep the numbers of the various registers aligned with each other, a marking register of the static recirculating type is provided and is common to all the data registers. A marking signal therein indicates the stage of the register which is being operated on at any given time, and a character marks the beginning of the contents of the data register to ensure the alignment of data therein.

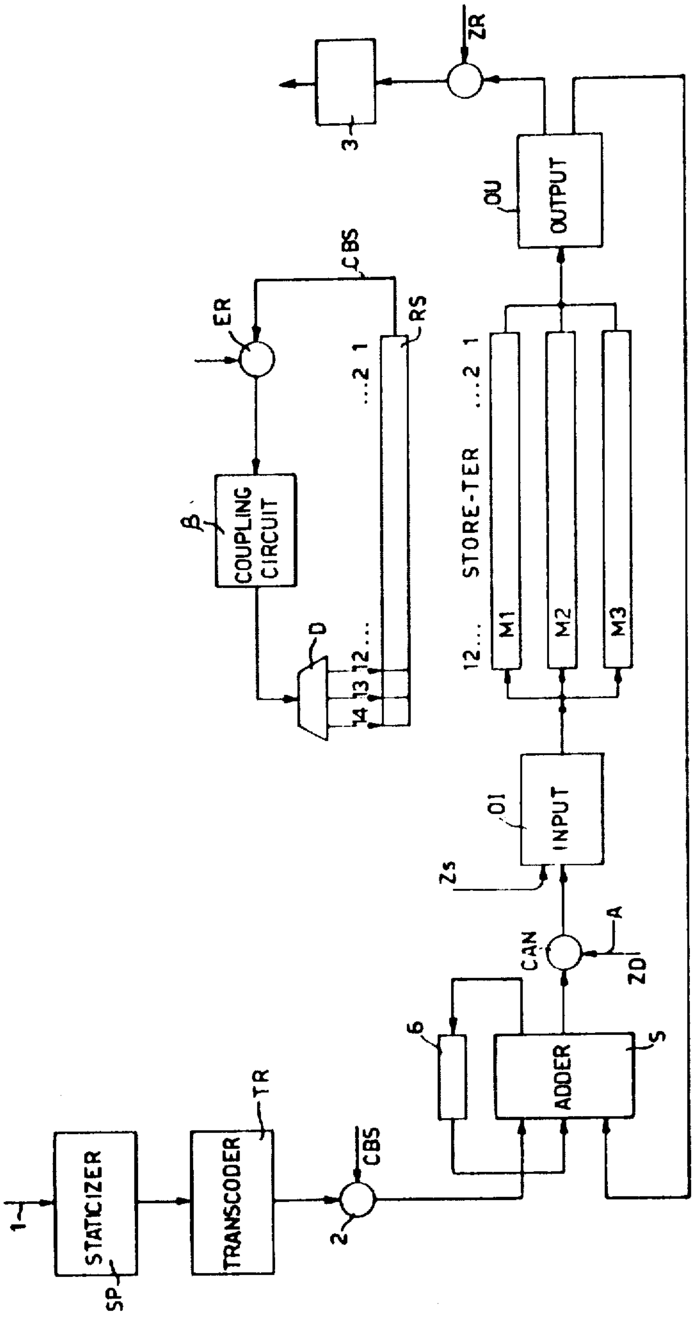
*INVENTOR.*
ROMANO TADDEI
*BY*
ATTORNEYS

ELECTRONIC RECIRCULATING STORES

BRIEF DESCRIPTION

The present invention relates to a store comprising a plurality of registers of the static, recirculating type operating in parallel. These registers may be, for example, stepping registers constructed with chains of magnetic cores. Stores of this type lend themselves to being combined with conventional mechanical accounting machines for the purpose of expanding the storage and calculating capacity thereof.

A problem that arises when the number of these registers is more than one is that of keeping the various numbers aligned in them in the course of the different operations. The problem is complicated by the fact that the numbers received from or transmitted to the accounting machine are not of fixed length and that the individual digits are received or transmitted by a system which is asynchronous with respect to the circulation of the data in the store and in an order different to that in which they are to be processed arithmetically.

The object of this invention is to solve the above-mentioned problems with a simple and inexpensive logic and circuit arrangement.

According to the invention there is provided an electronic store comprising a plurality of data registers of the static, recirculating type operating in parallel and a marking register of the static, recirculating type common to all the data registers and adapted to contain a marking signal indicating the stage which is being operated on at any given moment in the selected data register, and means responsive to a character marking the beginning of the contents of the data register in order to ensure the alignment of the data in said store registers.

DETAILED DESCRIPTION

The invention will be described in more detail, by way of example, with reference to the accompanying drawing, in which the sole FIGURE shows a logic diagram of the store and of a number of associated units.

The store TER is shown as constituted by three electronic registers or accumulators M1, M2, M3 with a capacity of 12 decimal digits which are capable of effecting the operations of addition, and of returning partial totals and general totals to an accounting machine and are adapted to operate in conjunction with an accounting machine equipped with a tabulating bar associated with the carriage for producing the programming of the accounting machine itself, as described, for example, in the specification of U.S. Pat. Nos. 2,849,179 and 3,006,540. The addressing of the electronic accumulators takes place by means of instructions programmed on the tabulating bar of the accounting machine. Each of the registers M1, M2, M3 is constituted by a stepping register having twelve stages each formed in turn of four stepping registers of the magnetic core type, whereby each group of four corresponding cores of these four registers constitutes one stage adapted to contain the four bits of a decimal digit. The shifting of the data along the chains of cores is produced by stepping pulses. Only one direction of shift is possible.

A marking register RS is moreover provided, this consisting of a single chain of fourteen cores acting as a stepping register synchronous with the registers M1, M2 and M3. The marking register is at the disposal of each of the three stores and its function is to mark the places corresponding to the successive orders of magnitude of the values in the stores, both in ascending order and in descending order, according to the requirements of each particular elementary operation.

In the following, the decimal places of the stores are numbered from one to 12 starting from the output core and proceeding towards the input core. That is, if it is desired to consider the direction of shifting of the digits from left to right (in the drawing), the numbering will proceed towards the "left." The same applies to the marking register, in which, however, the reckoning is from one to 14.

In the calculation phase, the marking register contains a single bit of value ONE, while all the other bits are of value ZERO. This bit, called the "marking bit," is propagated along the register in synchronism with the digits of the stores. On leaving the register, the bit is collected by the coupling circuit $\beta$, provided that the erasure thereof, controlled by a gate ER, is not previously ordered. From the circuit $\beta$, said bit is applied to the input cores (14th, 13th, or 12th, as selected by a decoder D according to circumstances) and in this way a recirculation path is established.

During the shifting of the contents of a register of store TER, the data are collected, one decimal digit at a time, by output means OU, which are connected through an adder S, and thence through a gate CAN for controlling a possible erasure, to input means OI. The signals come from the accounting machine along six parallel paths 1. These signals, representing service codes or incoming data, are collected in a staticizer SP, from which they are transmitted to a transcoder TR. The numerical data coming from the transcoder TR pass to the adder S, provided that a consent originating from the marking register RS on line CBS and controlled by the marking bit exists at the gate 2. In order to carry out processing of the data in the store TER, it is necessary to produce a certain number of circulations of the contents of the registers, these circulations, however, are always carried out in entirety, that is so as to preserve strictly a correspondence between the order of magnitude of the numbers and the stages of the registers.

It is required that the units order always falls in correspondence with the first place of the registers (cores on the extreme "right") and, therefore, to the cores which follow one another with ascending numbering there will correspond orders of decimal magnitude which are also ascending.

In order to be able to mark the completion of a circulation of the contents of a register, the following procedure is adopted: a marking value G (represented by the code of the 12th decimal digit) is introduced into the input means at the beginning of a circulation. The value G is therefore entered in the register "ahead" of the number contained therein and shifts with it; when the value G arrives at the output means, it causes the stepping control pulses to stop. Thirteen shifts, which constitute an exact circulation, (since the adder S effectively adds a 13th stage to each register), will therefore have been carried out and the contents of the register will therefore again occupy the same places or positions in the cores which they already occupied prior to the circulation.

Accumulation Operation

A number to be accumulated in the store TER is transmitted serially starting from the least significant digit. On the arrival of each digit, a single circulation of the selected register is effected. In the course of this circulation, the arriving digit is added to the digit already contained in the store in the corresponding decimal place. At the same time, any possible carries generated are added and are propagated to the higher decimal orders by a staticizer 6. These operations are repeated for all the digits forming the number transmitted. The addition will be complete when the most significant digit has been transmitted to the store TER.

In this phase, the marking bit defines which digit already contained in the store will be utilized in conjunction with the arriving digit to carry out an addition, acting as a timing means on the output gate 2 of the transcoder TR. In this case, the input to the marking register RS is applied to the 14th core, which ensures that the marking bit shifts to a place of higher decimal order with respect to the number in the store after each circulation. This is because 13 shifting steps produced under control of the signal G in the register are performed, and hence the marking register RS will not be able to complete a full circulation, which would require 14 shifting steps.

Therefore, there is defined for the marking bit an "immediate shifting" direction which is always to the right (that is, the rapid shifting from one core to the other), which is to be distinguished from the "decimal shifting" to the left in the adding phase, which takes place with each circulation.

Return Operation

This operation involves returning a number to the accounting machine. The partial or general total of TER is carried out by withdrawing the digits from the selected store one at a time and setting them automatically in the slide of the keyboard of the accounting machine through the medium of an electromechanical setting device 3 of the type described in U.S. Pat. No. 3,010,653. To do this, it is sufficient to mount on the tabulating bar a digit return control combined with a control for choosing the desired store.

The setting in the slide is naturally carried out in a descending order of decimal magnitudes, one digit being set for each elementary signal ZR emitted by a microswitch controlled by the mechanical driving means which produce the setting cycle for each digit in the accounting machine.

At each signal ZR, it will therefore be necessary to produce a complete circulation of the selected store in order to withdraw the desired digit as it leaves the cores. First of all, however, it is necessary to establish the place of the first, i.e., the most significant digit, of the number in the store. This place is clearly variable and unknown on the starting of a return operation. It would be possible to produce a fixed number of 12 signals ZR, that is one for each decimal place, whether it is vacant or not. This procedure, however, would be slow and has been discarded.

A "first digit search" therefore becomes necessary and is carried out starting from the initiation of the first signal ZR and concluded without delay before the initiation of the second of the group of return signals ZR.

In order to find the first digit, as many complete circulations are necessary as there are zeros in front of the number in the store. These circulations follow one another without interruption and at each of them the contents of the cores are examined starting from the 12th place. When the most significant digit is found, the circulation in progress will be completed and the stepping control pulses are stopped. The marking bit is written in the place corresponding to the first digit when the operation is complete.

In practice, the search for the first digit, at its maximum duration, is concluded within the limits of the first signal ZR, so that it will naturally not be possible to set the first digit in the slide, but certainly it will be possible to find the place thereof in the store. It is therefore arranged that the marking bit is disposed in the marking register in a position such that it will be possible to identify with the signals ZR which will follow, the first and therefore all the other digits for return thereof to the slide.

It is obviously necessary to arrange that the marking bit shifts towards a place of lower decimal order with respect to the contents of the store after marking a digit for setting thereof, for the purpose of making provision for the requirements of the operation of the signal ZR immediately following. The need for this "decimal shifting" of the marking bit towards the right in the return phase is easily met by establishing a connection of the circuit $\beta$ to the 12th core of the marking register, instead of to the 14th core.

On extraction of the units digit from the register, the stopping of the return stage will be produced by means of an electromagnet which, by acting on the mechanical means of the accounting machine, causes the stopping of the signals ZR. However, one signal ZR more than the number necessary for return will be emitted. This last signal ZR is utilized for complete erasure of the register being examined if a general total has been called for by the tabulating bar. In fact, under these conditions, the bar generates a signal A, which blocks the gate CAN.

As has been seen, the three registers share common input means OI. By means of a signal ZD generated by the tabulating bar, it is possible by means of the gate CAN to effect the erasure of a particular register thus discarding the digits therein, before the transmission of fresh data from the accounting machine.

A signal ZS produced by the accounting machine at the beginning of each phase of introduction of data from the accounting machine into the registers or accumulators M1, M2, or M3 and also at the beginning of each phase of return of the data from the selected accumulator to the accounting machine produces the writing in the input means OI of the signal G controlling the circulation of the data in the accumulators.

Detailed Description of the Accumulating Operation

This operation can be divided into two separate phases:

First phase: logic sequences carried out during the time when the accounting machine is transmitting a service code CZ to the staticizer SP.

Second phase: logic sequences repeated at each digit arriving from the accounting machine.

In both cases, there corresponds to each code or digit a signal ZS transmitted from the accounting machine; this signal produces a single circulation of the selected register in the store and of the register RS, permitting the generation of exactly 13 stepping control pulses. The selected register M1 or M2 or M3 can be denoted M.

The principal function of the code CZ is to prearrange the marking bit in the first place of the register RS (core on the extreme right in FIG. 1). Moreover, possible residual bits in this register which are due to preceding operations are erased by means of the gate ER. Finally, in the particular case of a service code CZD, it is also desired to erase the contents of the selected register, using the signal input ZD, before introducing fresh digits into it. These requirements are met in the course of the circulation of M and RS which is produced by the code CZ.

More particularly, if we use S/B to designate the pulses controlling the stepping from one magnetic core to the following one and B to designate the marking bit, during the time of the signal ZS the circuit $\beta$ and the decoder D are activated to transmit the bit B to the 13th core of the marking register RS with the first pulse S/B of the circulation. With the same pulse S/B, the signal G is transferred to the 12th place in the cores of the register M. In this way, a position of relative phase displacement is produced between the signal G and the bit B during their propagation to the respective cores. As the signal G is "ahead," it will arrive at the output of the register M with the 13th pulse S/B, while with the same pulse S/B the bit B will be written in the first place of the register RS. Since, at this moment, the pulses S/B cease, the marking bit stops in the desired place.

The digits which were already contained in M and which issue during the circulation are caused to reenter M through the adder and the input means OI. No additional is carried out on the contents of M, because during the code CZ the transcoder TR has ZERO numerical outputs. In the case of the service code CZD, however, $ZD=1$ throughout the time of the first phase and therefore the original data will not be able to reenter M, which is thus completely erased.

During the second phase, for each digit transmitted to TER a single circulation of M and RS is produced.

The transcoder TR transmits to the adder S the value of the digit transmitted at the moment of output of the marking bit from the marking register RS (signal CBS transmitted to the gate 2). This digit will therefore be added to the corresponding digit, coming from M, which is staticized at that moment in the output means OU and is therefore present at the other inputs of the adder. The sum of the two digits is then entered in the store with the following pulse S/B and any carry digit is retained in the staticizer 6. This carry digit will then be added to the immediately following digit coming from M and further carries which may be derived therefrom will be similarly added and will be propagated to the digits of ascending order of magnitude which will follow, while there will not be any output from the transcoder TR.

After each circulation, the marking bit has shifted by one decimal place to the "left" in the register RS, as has already been said.

In conclusion, the first digit that has arrived is added to the units in M, the second is added to the tens and so on, while the carries are entered automatically and for the entire extent of the number at each digit operation.

Detailed Description of the Return Operation

The return operation can also be divided into two separate phases:

First phase: Search for most significant digit.

Second phase: Setting of the entire contents of a store in the slide of the accounting machine, one digit at a time.

The first phase is produced by the emission of the first signal ZR of the accounting machine and has the function of arranging the bit in the marking register in a place corresponding to the location of the most significant digit in the store.

At the beginning of the first signal ZR, connection is established through the decoder D between the circuit $\beta$ and the 12the core of the register RS, in which the bit B will be written with the first pulse S/B. At the same time, with the same pulse S/B, the signal G is written in the 12th place of the register M. The pulses S/B continue to shift B and G, now "in phase," to the right together with the data of M and the bit which may already exist in the register RS. In this way, the first circulation begins. On conclusion thereof, however, the pulses S/B do not stop. Operation therefore continues with a second, a third and other circulations, according to need, and the signal G will issue a plurality of times.

During each circulation of the search phase, a test is made for coexistence of the marking bit with a digit of any value other than zero which occupies in the register the adjacent place on the right with respect to that corresponding to the marking bit. This examination is naturally made on output from the registers and is reduced to confirmation of the simultaneous presence of the conditions $B=1$ and digit present in the input means $OI=O$ or $\neq O$.

After each circulation, a digit not having been found in the manner set forth above, the bit B undergoes a decimal shift by one place to the right and, with the following circulation, the place of M at the immediately lower order of magnitude is examined in this way.

The circulations follow one another without interruption and the signal G recirculates together with the data until there is an indication that the first digit of M has been found. As this occurs in the course of a circulation, it is moreover necessary to provide for completion of this circulation. That is, the cessation of the signals S/B is produced only on the following issue of the signal G.

When this phase is concluded, the contents of M will again be in the original position and in the register RS there will be a single bit disposed in such manner as to correspond to that place of M in which the most significant digit of the total is contained.

The second phase comprises all the signals ZR from the second onwards. In correspondence with the signals ZR, a signal G is written at the input of M and therefore in the cores in the 12th place with the first pulse S/B. The bit B, however, is not generated for entry in RS, inasmuch as the marking bit entered in the register RS in the first phase is utilized.

The pulses S/B proceed normally until bit issues from the register RS simultaneously with the digit of M required for setting in the slide. At this point, the pulses S/B stop. The result is that the desired digit remains staticized in the output means OU and the circulation is momentarily suspended. Signals of long duration appropriate for controlling the slide setting electromagnets are obtained from the output means OU.

At the end of the signals ZR, generation of the pulses S/B is resumed in order to bring the circulation in progress to completion.

On the extraction of the last digit (the units), stopping of the transmission of the return signals ZR from the accounting machine is produced. It is recognized that the units are concerned, because the bit B issues from the register RS with the first pulse S/B of the circulation, that is simultaneously with the signal ZR.

It will be appreciated that many changes can be made in the embodiment of the invention specifically disclosed herein without departure from the spirit of the invention. Accordingly, the invention is not to be considered limited to that embodiment, but rather only by the scope of the appended claims.

What is claimed is:

1. An electronic storage arrangement comprising:
- a plurality of multistage data registers of the static, recirculating type operating in parallel,
- a static, recirculating marking register common to all said data registers for storing and circulating therein a marking bit which is indicative of the stage of a selected data register which is operating at any given point in time, said marking register having a recirculating length which is different from that of said data registers by at least one stage such that synchronous circulation of said data registers and said marking register will cause said marking bit to move in its stage position relative to the data in said data registers with every complete circulation of said data registers,
- a source of input data for said data registers and
- gating means responsive to said marking bit for allowing said input data to pass from said source to said data registers.

2. The arrangement defined in claim 1, wherein said marking register includes a sufficient number of stages as to allow said marking register to be adjusted to be longer or shorter than the stage length of said data registers, said marking register including means for adjusting said marking register to be longer or shorter than the stage length of said data registers so that said marking bit will be caused to drop back or advance in its position in said marking register relative to the position of the data in said data registers with every circulation of the latter.

3. A method for operating a storage arrangement comprising a plurality of multistage data registers of the static, recirculating type operating in parallel and a marking register of the static, recirculating type, said marking register being in common with said data registers comprising the steps of:
- positioning a marking bit in said marking register, so that said marking bit identifies the stage of any particular data register being operated on at a given point in time,
- causing said marking bit to move relative to the data in said data registers with each synchronous circulation of said data registers and said marking register by causing said bit to transverse a recirculation length which is different from the recirculation length of said data registers and
- applying said marking bit to a data input to said data registers once each circulation of said data registers to enable said data input to pass data to said data registers.

4. The method of claim 3 in which the data registers each comprise $n$ stages, the marking register comprises $n+2$ stages and an adder connected between the output and input of the data registers provides an additional stage, and in which an input set of data is to be accumulated with that already stored in one of the data registers, which further includes the steps of inserting the marking signal in the $n+2$nd stage of the marking register and circulating the data recorded therein through said one register before any accumulation, while advancing the marking signal synchronously therewith until it reaches the first stage of the marking register, then gating the successive digits of the input data into the adder along with the digit then available in the first stage of said one register by the marking signal at the output of that first stage, the data and the marking signal being synchronously shifted during a complete circulation between additions, with the marking signal always being returned to the $n+2$nd stage after it reaches the first stage.

5. The method of claim 3 in which the data registers each comprise $n$ stages, the marking register comprises $n+2$ stages and an adder connected between the output and input of the data registers provides an additional stage and in which data already stored in one of the data registers is to be transferred to another location, which further includes the steps of initially inserting the marking signal in the $n$th stage of the marking register and circulating the data recorded therein through said one register before any transfer, while advancing the marking signal synchronously therewith until it reaches the stage in which the most significant digit is recorded in the data register, then successively transferring each digit from the first stage of the data register as the marking signal reaches the first stage of the marking register, the data and the marking signal being synchronously shifted during a complete circulation between transfers, with the marking signal always being returned to the $n$th stage after it reaches the first stage.

* * * * *